(12) United States Patent
Young

(10) Patent No.: US 12,528,981 B2
(45) Date of Patent: Jan. 20, 2026

(54) FLAMELESS METHOD OF HEATING FOOD OR FOOD CONTAINERS

(71) Applicant: FOREVER YOUNG INTERNATIONAL, INC., Las Vegas, NV (US)

(72) Inventor: Daniel L. Young, Henderson, NV (US)

(73) Assignee: Forever Young International, Inc., Las Vegas, NV (US)

( * ) Notice: Subject to any disclaimer, the term of this patent is extended or adjusted under 35 U.S.C. 154(b) by 0 days.

(21) Appl. No.: 18/424,255

(22) Filed: Jan. 26, 2024

(65) Prior Publication Data

US 2025/0241481 A1   Jul. 31, 2025

Related U.S. Application Data

(60) Continuation of application No. 17/981,636, filed on Nov. 7, 2022, now abandoned, which is a division of application No. 16/469,518, filed as application No. PCT/US2017/066208 on Dec. 13, 2017, now abandoned.

(60) Provisional application No. 62/433,766, filed on Dec. 13, 2016.

(51) Int. Cl.
| | |
|---|---|
| *F24V 30/00* | (2018.01) |
| *A47J 36/28* | (2006.01) |
| *A61F 7/03* | (2006.01) |
| *C06B 23/00* | (2006.01) |
| *C06B 33/02* | (2006.01) |
| *C09K 5/18* | (2006.01) |
| *A61F 7/02* | (2006.01) |

(52) U.S. Cl.
CPC .......... *C09K 5/18* (2013.01); *A47J 36/28* (2013.01); *A61F 7/03* (2013.01); *C06B 23/001* (2013.01); *C06B 33/02* (2013.01); *F24V 30/00* (2018.05); *A61F 2007/0219* (2013.01)

(58) Field of Classification Search
USPC .................................................. 126/263.05
See application file for complete search history.

(56) References Cited

U.S. PATENT DOCUMENTS

| | | | | |
|---|---|---|---|---|
| 4,264,362 A * | 4/1981 | Sergev | ............... | H01M 8/065 |
| | | | | 428/570 |
| 4,522,190 A * | 6/1985 | Kuhn | ............... | A61F 7/03 |
| | | | | 149/19.91 |
| 4,941,483 A * | 7/1990 | Ridings | ............... | A24F 42/10 |
| | | | | 131/194 |
| 5,517,981 A * | 5/1996 | Taub | ............... | A47J 36/28 |
| | | | | 126/246 |
| 5,611,329 A | 3/1997 | Lamensdorf | | |
| 6,015,230 A * | 1/2000 | Wantz | ............... | G08B 29/145 |
| | | | | 374/1 |
| 6,099,556 A | 8/2000 | Usui | | |
| 6,309,598 B1 * | 10/2001 | Tully | ............... | A01N 25/20 |
| | | | | 422/26 |
| 6,548,541 B1 * | 4/2003 | Shaw | ............... | A61K 31/555 |
| | | | | 556/136 |
| 9,863,687 B1 * | 1/2018 | Sunol | ............... | A61F 7/02 |
| 2004/0042965 A1 | 3/2004 | Usui et al. | | |
| 2005/0056269 A1 * | 3/2005 | Venkatesan | ............ | C22C 14/00 |
| | | | | 126/263.05 |
| 2005/0198969 A1 | 9/2005 | Scudder et al. | | |
| 2006/0030745 A1 * | 2/2006 | Roselle | ............... | D06M 11/05 |
| | | | | 585/445 |
| 2008/0135040 A1 * | 6/2008 | Bommaraju | ........... | H01M 4/50 |
| | | | | 44/252 |
| 2009/0293859 A1 * | 12/2009 | Coffey | ............... | F24V 30/00 |
| | | | | 126/263.01 |
| 2010/0136186 A1 | 6/2010 | Bommaraju | | |
| 2012/0030992 A1 * | 2/2012 | Bommaraju | ........... | A47J 36/28 |
| | | | | 126/263.01 |
| 2012/0145189 A1 * | 6/2012 | Knopow | ............... | A47L 13/16 |
| | | | | 134/6 |
| 2012/0186141 A1 * | 7/2012 | Young | ............... | F24V 30/00 |
| | | | | 44/253 |
| 2014/0014088 A1 | 1/2014 | Young | | |
| 2018/0195765 A1 * | 7/2018 | Endo | ............... | F24V 30/00 |
| 2020/0128859 A1 * | 4/2020 | Cook | ............... | A47J 27/002 |
| 2022/0273135 A1 * | 9/2022 | Young | ............... | A47J 39/006 |

FOREIGN PATENT DOCUMENTS

| | | | | |
|---|---|---|---|---|
| CN | 1491271 | | 4/2004 | |
| CN | 102946832 A * | | 2/2013 | ............. A61F 7/034 |
| CN | 105038725 | | 11/2015 | |
| GB | 1001901 A * | | 8/1965 | |
| JP | H11511235 | | 9/1999 | |
| JP | 2009508563 | | 3/2009 | |
| JP | 2013-500216 | | 1/2013 | |
| WO | 2004104490 | | 12/2004 | |
| WO | 2006006645 | | 1/2006 | |
| WO | 2018112099 | | 6/2018 | |
| WO | WO-2018112099 A1 * | | 6/2018 | ............. A47J 36/28 |

* cited by examiner

*Primary Examiner* — Jorge A Pereiro
(74) *Attorney, Agent, or Firm* — SNELL & WILMER L.L.P.

(57) ABSTRACT

A food heating method of using an exothermic gel to minimize metallic odors in a presence of food or within a food container. The method can include generating an exothermic reaction that produces heat by exposing a mixture of the expandable exothermic gel-forming composition to water and one or more electrolytes in the absence of air to form the expandable exothermic gel, the mixture comprising first metallic galvanic particles and second metallic galvanic alloy particles, a metallic secondary shell comprised of at least one transitional metal, and a super absorbent polymer; and suppressing at or about 95% hydrogen byproducts of the exothermic reaction within the gel while in the presence of the food or the food container so that steam permeates around the food or the food container.

17 Claims, No Drawings

FLAMELESS METHOD OF HEATING FOOD OR FOOD CONTAINERS

FIELD

This disclosure relates generally to exothermic compositions that are predominately useful in the consumer products and medical industries.

BACKGROUND

The ability to produce heat without the use of electricity or burning fuels is desirable in many applications. In the cosmetic industry, heat is desired for the application of various cosmetics to the skin and scalp. In the medical profession, application of heat is important in physical therapy, orthopedics, wound healing, arthritis treatment, etc. In consumer products, the ability to keep food and other substances hot, as well as to heat them initially, is desired when other means of heating are not convenient or unavailable.

The utility of exothermic chemical reactions in such applications has been described. For example, the military has used a "flameless heating device" for heating rations in the field since at least 1973. These devices are in the form of a "hot sheet" consisting of a magnesium anode, a carbon electrode and an electrolyte salt. More recently, the military developed a dismounted ration heating device (DRHD) utilizing chemical heating pads composed of magnesium-iron alloy particles trapped in a semi-solid polyethylene matrix (See, e.g., U.S. Pat. No. 4,522,190).

Other examples of metal alloy particles to produce heat in the cosmetic industry have been described for use in conjunction with paper-based "fluff" as the absorptive material. However, such systems have relatively low energy potential and thus exhibit a short duration exothermic reaction, as well as non-uniform heating.

Accordingly, there is a need for compositions that can be used to generate heat in a convenient format that is safe, uniform, controllable and long-lasting. Therefore, a need exists to resolve these and other problems in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one embodiment, an expandable, exothermic particulate gel-forming composition is provided that includes first and second metallic galvanic alloy particles (or at least two different metallic galvanic alloy particles that are optionally alloyed together). In other embodiments, more than two different metallic galvanic alloy particles can be provided. A metallic secondary shell comprised of at least one transitional metal; and a super absorbent polymer; wherein the first and second metallic galvanic alloy particles (or each of the two or more different metallic galvanic alloy particles), the metallic secondary shell, and the super absorbent polymer are blended with each other; wherein the gel-forming composition expands as the gel-forming composition is hydrated and generates an exothermic reaction that produces heat for a predetermined duration of time when exposed to water and an electrolyte. The first and second metallic galvanic alloy particles, the metallic secondary shell, and the super absorbent polymer in some embodiments are blended with each other are brought into electrical contact. In some embodiments, a powder mixture is formed from first and second metallic galvanic particles that are blended with the super absorbent polymer. The predetermined duration of time can range from several minutes (e.g., 5 minutes) to several hours (e.g., 8 hours) but can be any duration of time desired or needed. The term "pre-determined" used in connection with a duration of time in this disclosure can be something that is known or expected based on the respective composition but not determined at each instance or necessarily known to a user unless specifically defined as such.

The claimed compositions provide gas suppression, for example hydrogen gas suppression, or suppression of gases typically generated by the underlying exothermic reaction such that these gasses do not escape the formed compositions (referring to the reacted, reacting, formed, gel/foam, expanding or expanded, exothermic, etc. composition) or their escape is suppressed to a significant degree discussed herein. In certain embodiments, a majority (or percentage described herein) of the gases produced by the exothermic reaction are suppressed and not released from the composition during the exothermic reaction.

In some embodiments, activated carbon is used with the composition as an odor absorber. The activated carbon can be present in an amount of about 2 to 25% of the composition. Activated carbon can include a combination of graphite materials, other carbon powders in various particle sizes.

In one embodiment, an expandable exothermic composition can include two or more different metallic particles, each having a different oxidation potential. A metallic secondary shell can be included having at least one transitional metal. A super absorbent polymer can also be included. The first and second metallic galvanic alloy particles, the metallic secondary shell, and the super absorbent polymer can be blended with each other (e.g., to a uniform powder mixture) and the gel-forming composition can expand as the gel-forming composition is hydrated to generate an exothermic reaction that produces heat for a predetermined duration of time when exposed to water and an electrolyte. In certain embodiments, a majority (or percentage described herein) of the gases produced by the exothermic reaction are suppressed and not released from the composition during the exothermic reaction.

In often included embodiments, an expandable, exothermic composition is provided comprising: first and second galvanic alloy particles (or at least two different metallic galvanic alloy particles that are optionally alloyed together); a super absorbent polymer; and potassium permanganate or potassium ferrate; wherein the first and second metallic galvanic alloy particles (or each of the two or more different metallic galvanic alloy particles), the potassium permanganate or potassium ferrate, and the super absorbent polymer are blended with each other; wherein the composition expands as the composition is hydrated to generate an exothermic reaction and produces heat for a predetermined duration of time when exposed only to water and an electrolyte. In certain embodiments, the first and second galvanic alloy particles comprise MgFe and $MnO_2$. Also frequently, between about 37% to about 93%, or over 93%, of gases produced by the exothermic reaction are suppressed and not released from the composition during the exothermic reaction.

In another embodiment, an expandable, exothermic composition is provided comprising: manganese oxide blended with a super absorbent polymer; and wherein the composition expands as the gel-forming composition is hydrated to generate an exothermic reaction and produces heat for a predetermined duration of time when exposed only to an aqueous solution. In some embodiments, the manganese oxide is manganese dioxide. In certain related embodiments, a majority (or percentage described herein) of the gases produced by the exothermic reaction are suppressed and not released from the composition during the exothermic reaction.

In some embodiments, the composition expands to form a stiff foam. In some embodiments, the composition fluffs up as the composition is hydrated. In some embodiments, the aqueous solution is hydrogen peroxide and the buffering agent is a blended mixture of compressed sponge and/or clay particles. In this regard embodiments, the composition of this embodiment can expand to form a stiff foam. In certain related embodiments, a majority (or percentage described herein) of the gases produced by the exothermic reaction are suppressed and not released from the composition during the exothermic reaction.

Kits are also provided, for example a kit comprising: a container; an exothermic particulate gel-forming composition according to any of the preceding claims; an aqueous activator solution, wherein the super absorbent polymer is operable to absorb the aqueous activator solution so that the gel-forming composition expands as the gel-forming composition is hydrated; and instructions specifying that the composition is activated in the absence of air upon contact with the aqueous activator solution to produce heat for a predetermined duration of time.

In another embodiment, an expandable, exothermic particulate gel-forming composition is provided comprising: first and second metallic galvanic alloy particles comprising magnesium and iron; a metallic secondary shell comprised of at least one transitional metal comprising manganese dioxide; and a super absorbent polymer comprising sodium polyacrylamide; wherein the first and second metallic galvanic alloy particles, the metallic secondary shell, and the super absorbent polymer are blended with each other; wherein the gel-forming composition expands as the gel-forming composition is hydrated and generates an exothermic reaction that produces heat for a predetermined duration of time when exposed to water and an electrolyte. In certain related embodiments, a majority (or percentage described herein) of the gases produced by the exothermic reaction are suppressed and not released from the composition during the exothermic reaction.

In another embodiment, an expandable, exothermic composition is provided having first and second metallic galvanic alloy particles comprising magnesium and manganese oxide (i.e. whereby the galvanic alloy particles do not include iron). A super absorbent polymer can be included as well as a carbon particles. The first and second metallic galvanic alloy particles, the super absorbent polymer, and the carbon can be blended with each other. The composition expands as the composition is hydrated with water and no electrolyte such as salt is necessary for inclusion in the water. Hydrating the composition can generate an exothermic reaction that produces heat for a predetermined duration of time. In certain related embodiments, a majority (or percentage described herein) of the gases produced by the exothermic reaction are suppressed and not released from the composition during the exothermic reaction.

In another embodiment, an expandable, exothermic (particulate) gel-forming composition is provided comprising: first and second galvanic alloy particles comprising magnesium and iron; a super absorbent polymer comprising sodium polyacrylamide; and potassium permanganate or potassium ferrate; wherein the first and second metallic galvanic alloy particles, the potassium permanganate or potassium ferrate, and the super absorbent polymer are blended with each other; wherein the gel-forming composition expands as the gel-forming composition is hydrated and produces heat for a predetermined duration of time when exposed only to water and an electrolyte. In certain related embodiments, a majority (or percentage described herein) of the gases produced by the exothermic reaction are suppressed and not released from the composition during the exothermic reaction.

In another embodiment, an expandable, exothermic composition that is fluffable and/or swellable is provided comprising: manganese oxide blended with a super absorbent polymer comprising sodium polyacrylamide. This embodiment can use a super absorbent polymers disclosed herein that are not sodium polyacrylamide. The composition expands as the composition is hydrated and produces heat for a predetermined duration of time when exposed only to an aqueous solution. In certain related embodiments, a majority (or percentage described herein) of the gases produced by the exothermic reaction are suppressed and not released from the composition during the exothermic reaction.

In another embodiment a kit is provided comprising: a container; an exothermic particulate gel-forming composition according to any of the preceding claims; an aqueous activator solution comprising water or a saline solution, wherein the super absorbent polymer is operable to absorb the aqueous activator solution so that the gel-forming composition expands as the gel-forming composition is hydrated; and instructions specifying that the composition is activated in the absence of air upon contact with the aqueous activator solution to produce heat for a predetermined duration of time.

In frequent embodiments contemplated herein, the composition is adapted to provide for minimal or approximately zero gases to be produced or released from the composition (referring to the reacted, reacting, formed, gel/foam, expanding or expanded, exothermic, etc. composition) during or otherwise as a result of the exothermic reaction. Often, between about 37% to about 93% of gases produced by the exothermic reaction are suppressed and not released from the composition during or otherwise as a result of the exothermic reaction. Also often, between about 93% to about 100% of gases produced by the exothermic reaction are suppressed and not released from the composition during or otherwise as a result of the exothermic reaction. In frequently included embodiments, over at or about 40%, over at or about 45%, over at or about 50%, over at or about 55%, over at or about 60%, over at or about 65%, over at or about 70%, over at or about 75%, over at or about 80%, over at or about 85%, over at or about 90%, or over at or about 93%, or over at or about 95% of gases produced by the exothermic reaction are suppressed and not released from the composition (again, referring to the reacted, reacting, formed, gel/foam, expanding or expanded, exothermic, etc. composition) during or otherwise as a result of the exothermic reaction.

Other aspects of the disclosed solution are found throughout the specification. To the accomplishment of the foregoing and related ends, the aspects disclosed in the specification are indicative, however, of but a few of the various ways in which the principles of the claimed subject matter may be employed and the claimed subject matter is intended to include all such aspects and their equivalents. Other advantages and novel features may become apparent from the following detailed description.

DETAILED DESCRIPTION

This solution is in the field of expandable, exothermic gel-forming compositions that are predominately useful in the consumer products and medical industries. More particularly, the herein disclosed solution relates to the use of expandable, particulate exothermic gel-forming compositions with long-lasting and efficient heat production for heating surfaces and objects in the absence of air without the need for electricity or combustible fuel. The exothermic gel-forming compositions of the present disclosure are generally formulated from several approaches.

Terms with commonly understood meanings may be defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, "a" or "an" means "at least one" or "one or more."

As used herein, the term "user," "subject," "end-user" or the like is not limited to a specific entity or person. For example, the term "user" may refer to a person who uses the systems and methods described herein, and frequently may be a technician. However, this term is not limited to end users or technicians and thus encompasses a variety of persons who can use the disclosed systems and methods.

The disclosed solution can now be better understood turning to the following detailed description. It is to be expressly understood that the described embodiments are set forth as examples and not by way of limitations on the embodiments as ultimately defined in the claims.

It is understood that "galvanic alloy" can mean a metal that is made by combining two or more metallic elements, including combining two or more different metal salts. The combination is often via a known means for alloying, including for example using an alloying process using a ball mill or the like.

It is understood that the term "blended" can mean blending two or more things together to form a mixture, such as a blended powder (uniformly or otherwise), homogeneous mixture or homogenous powder. A blender that can be used to "blend" two or more things together can include commercially available mixers and blenders, such as drum mixers, braun mixers, ribbon blenders, blade blenders, V-shaped blenders, batch mixers, or the like.

It is understood that the term, "activator solution," can mean water, water and an electrolyte, or other aqueous solution that when contacted with any of the exothermic compositions of this disclosure initiates, increases or renews an exothermic reaction.

As used herein, the term "gel" is intended to refer to materials traditionally known in the art as gels, in addition to foams and combinations thereof. Often, when formed, the foam is a foam having a certain level of structural rigidity or shape adherence such as a stiff foam. Such stiff foam may be capable of withstanding deformation against a certain level of outside force or be a self-supporting foam composition. As such, a gel-forming composition is intended herein to refer to a gel-forming composition and unless specifically indicated otherwise, also refers to a foam-forming composition. Also for example, an exothermic gel is intended herein to refer to an exothermic gel composition and unless specifically indicated otherwise, also refers to an exothermic foam composition. Also for example, a swelling gel or a gel matrix also, therefore, is intended to refer herein to a swelling foam or a foam matrix unless specifically indicated otherwise.

As used herein, an "exothermic composition" may be referred to as an "exothermic composition" prior to, during, or after initiation of an exothermic reaction using the composition.

The use of self-heating compositions is well known. Magnesium-Iron alloys activated by salt and water have been used by the military and recreational markets for decades. All of these reactions, however, are uncontrollable, violent and short in duration. These reactions use an oxidation-reduction reaction to effectively oxidize the metallic elements by splitting the water molecule into oxygen to produce heat while liberating hydrogen gas. This evolution of hydrogen gas can be a major limiting factor as to where these compositions can be used because of the explosive nature of hydrogen gas under normal atmospheric conditions.

Prior approaches to self-heating have incorporated galvanic alloys (e.g. Mg—Fe alloys) in combination with a super absorbent polymer (SAP). In turn, such approaches have achieved self-swelling gels formed by a fluffing action upon contact of the SAP with an aqueous solution (e.g. water or saline solution). This in turn permits the corresponding exothermic gel to expand to contour around objects and fill voids. More importantly, the swellable agents of the SAP electronically interfere with the oxidation process of the Mg—Fe, and with an understanding of the hydrogen bonding forces at play within the reaction, a controlled reaction can be designed with a calculated output of heat over a known time period. The heat-vs-time buffering effect of the SAP works within its own structure by utilizing the electron sharing and hydrogen-bonding forces in a tug-of-war between the oxidation tendencies of the galvanic alloy in the presence of water and an electrolyte. More specifically, a salt solution and the electronic attraction forces of the SAP matrix, namely hydrogen bonding and valence sharing. But as applicable as a controlled, calculated, time-release exothermic reaction powered by water can be, it still has the disadvantage of evolving hydrogen gas as a byproduct of the reaction.

Galvanic Alloy Particles

As discussed throughout this disclosure, those embodiments of the disclosed solution that include galvanic alloy (GA) particles can consist of a mixture of two or more metallic agents, each with a different oxidation potential, such that one serves as the cathode and the other serves as the anode in an electrochemical reaction, once the two components of the composition are brought into electrical contact with one another via an activator solution.

Exemplary metallic agents can include mixtures of copper, nickel, palladium, silver, gold, platinum, carbon, cobalt, aluminum, lithium, iron, iron(II)oxide, iron(III)oxide, magnesium, manganese, $Mg_2Ni$, $MgNi_2$, $Mg_2Ca$, $MgCa_2$, $MgCO_3$, $MnO_2$, and combinations thereof. For example, platinum may be dispersed on carbon and this dispersion used as a cathode material. See, e.g., U.S. Pat. Nos. 3,469, 085; 4,264,362; 4,487,817; and 5,506,069.

An exemplary anode material is magnesium, which reacts with water to form magnesium hydroxide ($Mg(OH)_2$) and hydrogen gas to generate large amounts of heat. Other metallic agents having high standard oxidation potentials (such as lithium) may also serve as the anode material, but are less preferred from a cost and safety standpoint. The cathode material will have a lower standard oxidation potential than the anode material. The cathode is not consumed in the electrochemical interaction, but serves as a site for electrons given up by the corroding anode to neutralize positively charged ions in the electrolyte. Exemplary cathode materials include iron, copper and cobalt.

In certain exemplary embodiments, the galvanic alloy comprises two different alloys that are alloyed together. Most often, such an alloy comprises a combination of two different galvanic alloys described and/or contemplated herein. For example, in one embodiment, the galvanic alloy comprises MgFe alloyed with $MnO_2$.

Any of the usual methods can be employed in the production of a galvanic alloy, such as conventional dissolution or mechanical alloying. The process of mechanical alloying involves, for example, inducing a solid state reaction between the components of an initial powder mixture by repeated mechanical deformations caused by ball-powder-ball collisions using a high energy ball mill. Such mechanical deformations may include, for example, repeated flattening, fracturing, and welding of metal constituents e.g., active and passive metal particles. The resultant energy produced from the impact of colliding steel balls with particles trapped between them creates atomically clean particle surfaces. These atomically clean particle surfaces allow them to cold-weld together.

The particle sizes of the metallic components before milling may vary from a few microns to a few hundred microns. In one embodiment, it may be desirable to have an average particle size less than 200 microns, such as 100-150 microns, to facilitate efficient alloying.

Exposure to oxygen or certain other reactive compounds produces surface layers that reduce or completely eliminate the cold welding effect. Therefore, an inert atmosphere can be maintained in the mill to prevent reoxidation of the clean surfaces, thereby avoiding the formation of oxide coatings on the particle surfaces which reduce galvanic cell reactions. An "inert gas" as used herein is an unreactive gas, such as nitrogen, helium, neon, argon, krypton, xenon, radon and also includes the nonoxidizing gas, carbon dioxide. The inert gas should be essentially free of water (less than 10 ppm, such as less than 5 or less than 1 ppm).

Generally, when the milling process is allowed to progress for an extended period of time, the particle structure becomes more refined and the cathode particles reduce in size. However, after a certain point in the milling process, any additional milling will result in a reduction of the corrosion rate due to the cathode material becoming too finely dispersed throughout the anode material. When this occurs, the ratio of cathode/anode particle surface area available for contact with the electrolyte decreases and hence the corrosion rate decreases. The resulting mechanically alloyed powders from a milling process are small particles consisting of matrices of active metal having smaller particles of passive metals dispersed throughout. Accordingly, milling time should be optimized for the best outcome in terms of electrical conductivity. In one embodiment, the galvanic alloy particles consist of magnesium and nickel, magnesium and iron, magnesium and copper, and magnesium and cobalt (U.S. Pat. No. 4,264,362). In magnesium-containing alloys, the magnesium is usually present in greater abundance, such as greater than 75%, 80%, 90% or 95% by weight.

Super Absorbent Polymer

In those embodiments of the disclosed solution that include a superabsorbent polymer (SAP), it is understood that SAP can be a "slush powder," "water-insoluble absorbent hydro gel-forming polymer," "hydrogel-forming" polymer or "hydrocolloid." The use of SAP is important because, when combined with an aqueous solution, a gel that expands can be created. This water-based gel can store a significant amount of the heat generated by the exothermic reaction due to its high specific heat capacity. Thus, the gel stays hot for a relatively long period of time (compared to the exothermic reaction carried out in the absence of gel). The gel also prolongs the duration of time that the object being heated can be maintained at a relatively constant elevated temperature. Additionally, as the gel-forming composition expands, heat can be transferred to more surface area of external objects than if the gel did not expand.

The term "super absorbent polymer" can be any polymer capable of swelling to 200 gms per gm of dry polymer when exposed to water. Generally, SAPs are loosely cross-linked, three-dimensional networks of flexible polymer chains that carry dissociated, ionic functional groups. The absorption capacity of a SAP relative to a particular material, such as water, is determined by osmotic pressure and the polymer's affinity with that material as well as the polymer's rubber elasticity.

The difference between the ion concentration inside a SAP and that of the surrounding water solution determines the intensity of available osmotic pressure. Therefore, the osmotic pressure enables a SAP to absorb a large quantity of water. Additionally, a particular polymer's affinity for its surrounding solution also affects the absorption capacity of the polymer. Thus, based on a polymer's absorptive capacity due to the surrounding osmotic pressure and the polymer's affinity for water, a SAP can absorb large quantities of water and other aqueous solutions without dissolving by solvation of water molecules via hydrogen bonds, increasing the entropy of the network to make the SAPs swell tremendously.

The factor that suppresses a SAP's absorbing power, in contrast, is found in the elasticity of the gel resulting from its network structure. The rubber-like elasticity of a polymer increases with the crosslinking density of the polymer, wherein the absorption capacity of a given SAP reaches its maximum when its rubber elasticity attains equilibrium with its water absorbing power.

Examples of SAPs can include a polyacrylic acid salt-based polymer, a vinyl alcohol-acrylic acid salt-based polymer, a PVA based polymer or an isobutylene-maleic anhydride polymer. Other examples of SAPs include polysaccharides such as carboxymethyl starch, carboxymethyl cellulose and hydroxypropyl cellulose; nonionic types such as polyvinyl alcohol and polyvinyl ethers; cationic types such as polyvinyl pyridine, polyvinyl morpholinione, and N,N-dimethylaminoethyl or N,N-diethylaminopropyl acrylates and methacrylates; and carboxy groups which include hydrolyzed starch-acrylonitrile graft copolymers, partially neutralized hydrolyzed starch-acrylonitrile graft copolymers, hydrolyzed acrylonitrile or acrylamide copolymers and polyacrylic acids.

Methods of making SAPs are well known and can be easily optimized to achieve a desired swellability. For example, SAPs can be made from the polymerization of acrylic acid blended with sodium hydroxide in the presence of an initiator to form a polyacrylic acid sodium salt (i.e. "sodium polyacrylate.) Other materials also used to make SAPs are polyacrylamide copolymer, ethylene maleic anhydride copolymer, cross-linked carboxy-methyl-cellulose, polyvinyl alcohol copolymers and cross-linked polyethylene oxide.

Although there are many types of SAPs commercially available, most are lightly cross-linked copolymers of acrylate and acrylic acid, and grafted starch-acrylic acid polymers prepared by inverse suspension, emulsion polymerization or solution polymerization. Inverse suspension polymerization is generally used to prepare polyacrylamide-based SAPs and involves dispersing a monomer solution in a non-solvent, forming fine monomer droplets to which a stabilizer is added. Polymerization is then initiated by radicals from thermal decomposition of an initiator.

SAPs found to be particularly suitable include, for example, AQUA KEEP® Super Absorbent Polymer manufactured by Sumitomo Seika Chemical Company (Osaka, Japan). For some embodiments, a fast-acting version of AQUA KEEP® found to be suitable is AQUA KEEP® 10SH-P. Additional polymers can be found commercially as CABLOC 80HS, available from Stockhausen Inc., Greensboro, N.C.; LIQUIBLOCK®2G-40, available from Emerging Technologies, Inc., Greensboro, N.C.; SANWET IM1000F, available from Hoechst Celanese Corporation, Bridgewater, N.J.; AQUALIC CA, available from Nippon Shokubai Co., Ltd., Osaka, Japan; and SUMIKA GEL, available from Sumitomo Kagaku Kabushiki Kaisha, Japan. Additional SAPs are also commercially available from a number of manufacturers, such as Dow Chemical (Midland, Mich.) and Chemdal (Arlington Heights, Ill.). Any of the aforementioned SAPs can be included as a blend of two or more polymers, so long as the majority of the polymer (more than 50% and preferably more than 70%, weight per weight) has an absorption capacity equal to or greater than 200 gms per gram.

Absorption measurements can be conducted under several methods, including the tea-bag method, centrifuge method and sieve method. According to the tea-bag method, a sample is placed in a bag measuring about 5×5 cm and the bag is then sealed around its perimeter. The bag is then placed in a dish with an excess of either water or 0.9% NaCl solution and the sample is allowed to absorb the solution and swell freely in the bag for one hour or until it reaches equilibrium. The bag is then removed to separate the sample from any excess solution and weighed to calculate the swelling capacity. The absorption capacity of the polymer sample can then be calculated in accordance with the following formula:

$$A_S = \frac{m_m - m_b(1 + A_b) - m_s}{m_s}$$

Where: $A_s$=sample absorbency; $A_b$=tea bag material absorbency; $m_m$=weight of tea bag with sample after absorption; $m_b$=weight of empty, dry tea bag; and $m_s$=weight of dry sample.

In one embodiment, the SAP (or at least a majority of the SAP if a blend of two or more is used) has an absorption capacity of at least 200 g/g, where 1 g of SAP is capable of absorbing up to 200 g of water. The SAP can also be a fast acting polymer with an absorption rate of no more than 20 seconds, and more preferably no more than 10 seconds or no more than 5 seconds.

Encapsulation

All of the disclosed embodiments can be further processed to include some degree of encapsulation of components to control the exothermic reaction. For example, one approach is to encapsulate the GA particles or the gel-forming composition to both extend its shelf life and control the release of energy once exposed to the activating solution. "Encapsulation," as used herein, means that at least portions of the GA or other parts of the gel-forming composition are substantially enclosed in a suitable encapsulation material, such that the encapsulation material is adhered to the surface of the particles. "Suitable encapsulation material," or "encapsulant," as used herein, means a material that is sufficiently robust to withstand formulation and manufacturing conditions of the gel-forming compositions, is compatible with the formulation and does not adversely impact its performance, with the caveat that extending heat production is not an adverse effect. In addition, a suitable encapsulation material adheres to the composition. Adhesion of the encapsulant may occur through covalent chemical bonding or through non-covalent interactions (e.g., ionic, Van der Waals, dipole-dipole, etc.).

"Microencapsulated," as used herein, means that the average diameter of the encapsulated component is from about 1 μm to about 1000 μm. If the encapsulated component is oblong or asymmetrical, then the average diameter is measured across that part of the component having the greatest length. In one embodiment, all or some portion of the foregoing compositions can be microencapsulated, and the encapsulated product has an average diameter from about 1 μm to about 1000 μm, alternatively from about 1 μm to about 120 μm, alternatively from about 1 μm to about 50 μm, and alternatively from about 1 μm to about 25 μm. In another embodiment, the encapsulated product has an average diameter from about 100 μm to about 800 μm, or from about 500 μm to about 700 μm, such as 600 μm.

Non-limiting examples of suitable encapsulation materials include polystyrene, methacrylates, polyamides, nylons, polyureas, polyurethanes, gelatins, polyesters, polycarbonates, modified polystyrenes, and ethylcellulose degradable polymer matrices. In one embodiment, the encapsulation material is poly(lactide-co-glycolide) (PLG), poly(glycidyl-methacrylate)(PGMA), polystyrene, or combinations thereof. In an alternative embodiment, the encapsulant is hydroxypropyl methylcellulose. Suitable encapsulation materials may have a molecular weight of from about 5 kDa to about to about 250 kDa, alternatively from about 200 kDa to about 250 kDa, alternatively from about 50 kDa to about 75 kDa, alternatively from about 10 kDa to about 50 kDa and alternatively from about 10 kDa to about 25 kDa.

It should also be understood that it is possible to encapsulate any or all of the alloy components (i.e., both the cathode and anode), either the cathode and/or the anode separately, with or without a binder. Through routine optimization using different combinations of coatings of varying components and using known encapsulation techniques, the ideal encapsulation format can be determined based on the use to which the composition is being put. For example, for a body wrap intended to achieve a therapeutic benefit for a longer period of time, a less dissolvable coating would be desirable to extend the time period of the heat production.

Alternatively, for the administration of a medicament, a more dissolvable coating would be desirable to achieve a higher temperature over a shorter time span.

The chemical properties of the above-described coatings and their use in a variety of fields such as nanotechnology, energetic materials and the medical field is well known and such optimization could be easily achieved based on this vast body of knowledge.

Binders

The gel-forming composition can also include at least one binder, such as a polymer or plastic, in addition to the SAP. Exemplary binders include natural resins, synthetic resins, gelatins, rubbers, poly(vinyl alcohol)s, hydroxyethyl celluloses, cellulose acetates, cellulose acetate butylates, poly(vinylpyrrolidone)s, casein, starch, poly(acrylic acid)s, poly(methylmethacrylic acid)s, poly(vinyl chloride)s, poly(methacrylic acid)s, styrene-maleic anhydride copolymers, styrene-acrylonitrile copolymers, styrene-butadiene copolymers, poly(vinyl acetal)s (e.g., poly(vinyl formal) and poly(vinyl butyral)), poly(ester)s, poly(urethane)s, phenoxy resins, poly(vinylidene chloride)s, poly(epoxide)s, poly(carbonate)s, poly(vinyl acetate)s, poly(olefin)s, cellulose esters, and poly(amide)s. The binders may added to the gel-forming composition as a solution or emulsion in water or an organic solvent and blended together using known methods.

Hydrogen Gas Suppression

As contemplated herein, gas suppression and in particular hydrogen gas suppression, is viewed relative to a similar or identical non-suppressed reaction. In a non-suppressed reaction, gas is freely produced at a known level, previously known level, or a level that can be calculated based on the reactants. Gas suppression as contemplated herein refers to a percentage reduction in gas production and release from the formed exothermic composition (e.g., gel, foam, etc.) relative to a non-suppressed reaction. Experimental data provided herein for an exemplary embodiment demonstrates over 90% gas suppression, though higher levels of gas suppression are contemplated up to and including 100% gas suppression. In certain embodiments, a gas suppression of between at or about 30% to at or about 95% is provided. In certain embodiments, a gas suppression of at or about 37%, or over about 37%, is provided. In certain embodiments, a gas suppression of between about 37% to 93%, at or about 93%, or over about 93%, is provided.

In one embodiment, a gel-forming exothermic composition that suppresses hydrogen gas byproduct can be prepared from a homogenous mixture of SAP, one or more GA particles, and a metal with secondary shell or electronic orbit bonding properties, also referred to as metallic secondary shells. This metallic secondary shell can inhibit or prevent the formation of hydrogen gas due to reaction with the secondary shell electrons or within the electron sharing patterns, eliminating the hydrogen byproduct at outermost surfaces of the GA alloy particles. Effectively, the metallic secondary shell thwarts the production of hydrogen gases at the surface level. Typically, most elements can only use electrons from their outer orbital to bond with other elements. These metals with "secondary-shell" bonding properties can use the two outermost shells/electron orbitals, e.g., the s orbitals, d orbitals, p orbitals and/or f orbitals common to the electronic structure of these metallic secondary shells, to bond with other elements to produce unexpected combinations. In the case of this embodiment, instead of the hydrogen atom being reduced and becoming $H_2$ or molecular hydrogen gas, it is inhibited by this secondary interaction as it bonds with the elemental Magnesium atoms, Magnesium Hydroxide, Magnesium Oxide and/or water molecules.

Exemplary metallic secondary shells can include transitional metals such as Scandium, Titanium, Vanadium, Chromium, Manganese, Iron, Cobalt, Nickel, Copper, Zinc, Yttrium, Zirconium, Niobium, Molybdenum, Technetium, Ruthenium, Rhodium, Palladium, Silver, Cadmium, Hafnium, Tantalum, Tungsten, Rhenium, Osmium, Iridium, Platinum, Gold, Mercury, Rutherfordium, Dubnium, Seaborgium, Bohrium, Hassium, Meitnerium, and Ununnilium.

One embodiment of the metallic secondary shells can include Manganese Dioxide. Manganese Dioxide is an effective inhibitor for hydrogen gas, is relatively inexpensive, readily available, safe and harmless to the environment, people, plant and animal life.

Any of the herein disclosed metallic secondary shells can be combined with the GA particles by milling them together with a ball mill, and then further mixing the Super Absorbent Polymer (SAP) materials together with the composition. In certain embodiments, a homogenous mixture can be generated using any of a variety of commercially available mixers and blenders, such as drum mixers, braun mixers, ribbon blenders, blade blenders, V-shaped blenders, batch mixers, or the like. A preferred blender is one that does not excessively shear the GA particles, the metallic secondary shell, or SAP. Depending on the type of equipment used, the two main components and any optional components are added to the mixing vessel either sequentially or simultaneously and mixing is carried out until a uniformly blended product is formed.

With this gel-forming composition, output gasses are drastically reduced and heat is safely and effectively produced, in the absence of oxygen for activation and largely without a hydrogen gas byproduct. In some embodiments, it has been found that between 90-100% of hydrogen gas byproduct has been suppressed or inhibited as compared to if the secondary shell were not included in the gel-forming composition.

In other embodiments of this composition, as a result of the net inhibition of hydrogen gas, other improvements are provided. For example, typical Mg—Fe alloy reactions with water produce a very "metallic odor" as the human olfactory sense can detect the hydrogen gas as a metal smell. Typical Mg—Fe alloy reactions with water produce a very "metallic odor," which the human olfactory senses can discern. This odor, while non-toxic, can be very offensive to certain people, especially in the presence of food. The eating experience is both taste and odor related, so an offensive odor can ruin an eating experience. While food and eating is one example, the benefits of preventing such metallic odors provides a number of other benefits and a broader range of potential uses of the underlying compositions. Certain embodiments of this composition resolve this problem by preventing the metallic odor from originating, and by absorbing any other odors into the hydrogel formed by the SAP.

In other embodiments of this composition, to reduce or inhibit the "metallic odor" of the Mg—Fe alloy reaction, activated carbon is used with the composition as an odor absorber. While the activated carbon may struggle, in certain embodiments, to absorb hydrogen gas byproduct, adding activated carbon to the composition unexpectedly interacts with the "push-pull" or "tug-of-war" between electrons of the exothermic reaction so that the orbital shells and the hydrogen bonding forces work with and against the SAP gel matrix. In this regard, the SAP's ability to buffer, control, lengthen and make predictable the heat profiles can be affected by adding activated carbon. Surprisingly, the addition of activated carbon helps make the exothermic reaction more efficient and longer yield with an overall higher caloric output. The activated carbon can be present in an amount of about 2 to 25% of the composition.

Activated carbon can include a combination of graphite materials, other carbon powders in various particle sizes. In general, activated carbon forms contemplated herein are electrically conductive forms of activated carbon. Using combinations of some or all of these modifiers to the electrical interactions of the gel-forming composition, is particularly advantageous as to overall efficiency of the exothermic reaction. Specifically, as the magnetic qualities of the conductive mineral interact with the above mention electrical/hydrogen bond struggle between the SAP and the alloy.

In other embodiments, an expandable, exothermic composition is disclosed using Magnetite ($Fe_3O_4$) in combination with one or more of the galvanic alloy particles and SAP embodiments described in this disclosure. Using Magnetite is particularly advantageous since when activated with an aqueous solution, an exothermic reaction can be generated having a unique heat curve (e.g., can generate heat a longer duration of time and/or at higher temperatures) without sacrificing heat output duration.

The activating solution can be generally an aqueous solution, such as water. It is also important to note that either the gel-forming composition or the activating solution contains at least one electrolyte, which assists in the electrochemical process that is needed to initiate the exothermic reaction. As used herein, the term "electrolyte" means a substance containing free ions that is electrically conductive. Electrolyte solutions are usually ionic solutions and commonly exist as solutions of acids, bases or salts. Salts when placed in an aqueous solvent such as water dissociate into their component elements. Examples of preferred electrolytes include potassium chloride, sodium chloride and calcium chloride.

The particulate gel-forming composition is tested by measuring expansion volume and rate, as well as heat production and retention. A particulate gel-forming composition is considered optimal if it expands (volume/volume) at least two fold, and preferably five fold or even ten fold. It is considered to be "efficient" if it is capable of achieving a temperature of at least 105° F. and maintaining a temperature of at least 100° F. for one hour.

In one embodiment, magnesium-iron particles can be prepared by mixing together 2-20% by weight iron with 80-98% by weight magnesium in a hermetically sealed ball mill.

In one embodiment, the exothermic particulate gel-forming composition has an absorption capacity of greater than 400 g/g.

In one embodiment, the blended mixture is formed by mixing a weight ratio of 20:1 to 5:1 galvanic alloy particles to super absorbent polymer. In other embodiments, the mixture is formed by mixing a weight ratio of approximately 1:1 galvanic alloy particles to super absorbent polymer. In other embodiments, the mixture is formed by mixing a weight ratio of 20:1 to 5:1 super absorbent polymer to galvanic alloy particles.

Air is evacuated with an inert dry gas prior to milling. Milling continues at or near room temperature (e.g., 15 to 50° C.) until the product is uniform. The galvanic alloy product can be tested for its ability to react when contacted with saline solution (e.g., 0.5 to 10% sodium chloride) by measuring a loss in weight, primarily due to the emission of water vapor.

In frequent embodiments contemplated herein, the composition is adapted to provide for minimal or approximately zero gases to be produced or released from the composition (referring to the reacted, reacting, formed, gel/foam, expanding or expanded, exothermic, etc. composition) during or otherwise as a result of the exothermic reaction. In frequently included embodiments, over at or about 40%, over at or about 45%, over at or about 50%, over at or about 55%, over at or about 60%, over at or about 65%, over at or about 70%, over at or about 75%, over at or about 80%, over at or about 85%, over at or about 90%, or over at or about 93%, or over at or about 95% of gases produced by the exothermic reaction are suppressed and not released from the composition (again, referring to the reacted, reacting, formed, gel/foam, expanding or expanded, exothermic, etc. composition) during or otherwise as a result of the exothermic reaction.

Hydrogen Byproduct Sequestration

In another embodiment, GA particles can be blended or mixed with super absorbent polymers and a permanganate or ferrate oxidant, such as lithium permanganate, sodium permanganate, potassium permanganate, lithium ferrate, sodium ferrate, or potassium ferrate, to form a homogenous mixture. In this regard, a safe, self-heating composition based on an oxidation reaction of GA particles such as Mg—Fe is disclosed for oxidizing or eliminating the hydrogen within the composition before the hydrogen gas byproduct can escape. The gel-forming composition can be activated in the absence of air upon contact with an activator solution, such as an aqueous electrolyte solution such as water or saline solution, as previously described.

Adding a permanganate or ferrate oxidant such as potassium permanganate or potassium ferrate to the GA and SAP mixture results in an oxygen source capable of combining with the hydrogen released by the Mg—Fe alloy, before it can convert to hydrogen gas and escape. In turn, during the reaction, water and hydrogen peroxide ($H_2O_2$) can be produced, which in turn feeds back into supplying the Mg—Fe alloy with a source of water to aide in its oxidation-reduction reaction. Hydrogen peroxide ultimately breaks down in this embodiment into water and another source of oxygen molecules. In other words, $H_2$ gas byproduct can be captured and converted into water. While potassium permanganate or potassium ferrate may be preferred, other reducible species can be used within the confines of this disclosure.

In certain embodiments of this composition, using such oxidants with the gel may result in a purple stain or discoloration attributable to, for example, potassium permanganate. For certain applications, such as with warming of food, this could be a prohibitive byproduct because the food container may contacts a permeable pouch and the staining agents would transit out of the permeable pouch onto the food container and thus to the hands of the person eating the food. However, this discoloration and staining can be resolved by the gellation of the composition. For example, a rubber-like, thick hydrogel that is exhibited in certain embodiments can sequester liquids before they stain or discolor the surrounding material. The transfer of the discolored solution can then be reduced or eliminated since the staining agents are "trapped" or sequestered by the gel.

At the same time, the oxygen generated by these reducible species can flow or "bubble through" the gel allowing recombination with free hydrogen molecules, which can take place within the gel.

The composition and activation by the liquid activator can take place inside a sealed container to permit time for any staining agent to be absorbed and sequestered the gel-forming composition. In certain embodiments, one or more layers of the container may optionally be permeable whereas others may optionally be impermeable.

In certain embodiments, the heat generated within the container expands the container due to the production of air and the outflow of water vapor. Accordingly, the container must be vented to outside atmospheric pressure. This venting can occur via a panel of permeable material such as non-woven (or woven) fabric, a perforated plastic cover, or the like. This permeable layer may be disposed over a chamber where the composition comes into contact with the aqueous solution. In order to further delay any leakage of the staining solution, a layer of water-soluble film or coating may also be applied to the inner side of the permeable layer immediately adjacent the composition. A non-limiting example of water soluble material can be polyvinyl alcohol (PVA or PVOH), but any water-soluble coating or film can be used as needed or required. In other embodiments, the container can include a steam-pressure valve. These "valves" can vent steam or hot air pressure at a predetermined level. This level of delay is, in certain embodiments, time-programmed to ensure that all liquid staining agents are sequestered.

By delaying the venting of steam and heated byproduct gasses from the sealed container, further mixing and combining can occur as to the free oxygen introduced by the reducible species reference above and the free hydrogen produced by the oxidation of the GA alloys. In turn, hydrogen byproducts can be further eliminated. Additionally, in certain embodiments, as the heat and wetness of the gel and steam permeate the water-soluble coating, it may quickly dissolve before substantial pressure can build within the container. In turn, the pressure can be released through the permeable layer. This delay can also ensure that all free hydrogen gas is removed.

An Exothermic Gel with No Hydrogen Gas Byproduct

In another embodiment, a catalyst for peroxide decomposition can be blended or mixed with a buffering agent, such as the aforementioned SAP, to form a mixture such as a powder mixture that is uniform or otherwise homogenous. When the catalyst is combined with the peroxide decomposition and the buffering agent, an exothermic reaction can be caused that imparts no hydrogen gas byproduct. Other buffering agents are contemplated for use with the composition, including particles from blended compressed sponge, clay particles, and other synthetic and modified natural materials. Some synthetic superabsorbent material polymers contemplated for use with the composition as a buffering agent, including the alkali metal and ammonium salts of poly(acrylic acid) and poly(methacrylic acid), poly(acrylamides), poly(vinyl ethers), maleic anhydride copolymers with vinyl ethers and alpha-olefins, poly(vinyl pyrrolidone), poly(vinylmorpholinone), poly(vinyl alcohol), and mixtures and copolymers thereof. However, the composition is not so limited and other superabsorbent materials contemplated for use with the composition include other natural and modified natural polymers, such as hydrolyzed acrylonitrile-grafted starch, acrylic acid grafted starch, methyl cellulose, chitosan, carboxymethyl cellulose, hydroxypropyl cellulose, and certain natural gums, such as alginates, xanthan gum, locust bean gum and so forth.

The amount and characteristics of the buffering agent for use with the catalyst for peroxide decomposition can be selectively varied to control and/or stabilize the exothermic reaction associated with the composition. The buffering agent may also be selectively varied to adjust the caloric value output of the composition at a higher or lower rate by suppressing, for example, a carbonate solution with, for example, a magnesium sulfate. In turn, this affects the mechanism by which the composition reacts so that hydrogen peroxide decomposition is capable of flattening. This is particularly advantageous as it renders decomposition more efficient since it has also been discovered that rendering a stable exothermic reaction more inefficient or unstable is one approach to control or modifying output of the reaction.

The exothermic, expandable composition in these embodiments can be activated upon contact with an activator solution containing a peroxide, e.g. hydrogen peroxide ($H_2O_2$). For example, a peroxide decomposition catalyst can be blended with SAP and activated with hydrogen peroxide to produce an exothermic reaction. The peroxide decomposition catalyst can be any peroxide decomposition catalyst suitable for mixing with SAP or one or more other buffering agents. For example, the peroxide decomposition catalyst can be manganese oxide, a ferric salt such as ferric chloride, or an enzyme such as catalase.

In certain embodiments, encapsulation of the catalyst can affect the curve of heat output, delay or prolong the reaction, based on solubility of the encapsulant. Other approaches to affecting the heat output may include varying the catalysts, including manganese oxide ($MnO_2$), zinc oxide (ZnO), copper oxide, $PhO_2$, lead dioxide, red iron (III) oxide, peroxidase enzymes, potassium iodide, ferric chloride, or the like.

This composition is particularly advantageous as the exothermic reaction associated with the composition is long-lasting, safe, controlled, and the activator solution has a much lower freezing point versus saline solution or water. This is particularly useful in operating environments where temperatures can be substantially reduced such as higher altitudes or sub-zero conditions. Preferably, 35% weight hydrogen peroxide can be used with a freezing point of −31° C., however, other weight percentages can be used as needed or required. Moreover, because the reaction is catalytic, the presence of the peroxide decomposition catalyst can be minimized in the SAP mixture or mixture with one or more other buffering agents. In one preferred embodiment, a homogeneous mixture of manganese oxide and SAP can be treated with a peroxide solution to generate an exothermic reaction that produces only water and oxygen gas.

The gel-forming compositions of the present disclosure are useful because they form an expanding gel or foam matrix when hydrated, and create a balance between energy release and energy governance. In certain embodiments, this is brought about by the relationship between the SAP and other active ingredients in the herein disclosed compositions. Though not wishing to be bound by any theory of operation, the SAP absorbs the aqueous solution rapidly, which limits the reaction potential of the remaining ingredients of the composition. A controlled reaction then ensues as moisture is transferred from the gel component to the remaining component(s). This reaction liberates heat that is transferred back into the gel that stores the heat rather than letting it escape into the air in the form of heated gases. This synergistic heat storage and distribution system provides a beneficial effect for commercial applications such as medical, therapeutic and beauty treatments. Since the gel-forming particles expand as they are hydrated, they can be incorporated into any of a number of different apparatuses and as they swell, they expand where desired, which can be used to create an even blanket of exothermic gel, thereby maximizing surface area contact and eliminating areas of non-uniform heat. The peroxide decomposition rate can be modified, for example, by sodium carbonate solution additions and variations and relatively high concentrations of magnesium in salt or ionic form, for example, magnesium sulfate.

In the examples that follow, the conditions such as weight ratios, mixing times, and other data points can easily be optimized for the particular intended use. For example, in a consumer applications, it is often desirable to provide a composition that achieves a higher temperature than for a medical product intended to contact the skin.

Example 1

MgFe Embodiment with Non-Suppressed Hydrogen Gas

In one embodiment, galvanic alloy materials include 0.5 grams of MgFe and 0.5 grams SA60S. The galvanic alloy and SAP (SA60S) mixture is placed in the test tube and 5 grams of 3% saline solutions is added. A stopper is positioned that forces gases expelled by the exothermic reaction to pass through the tubing into a completely full water flask. Water is displaced into a beaker. The amount of water displaced by the gas evolution was recorded, with test 1 showing 303.2 grams of water displaced, test 2 showing 305.6 grams of water displaced, test 3 showing 298.7 grams of water displaced, test 4 showing 301.2 grams of water displaced, and test 5 showing 304.6 grams of water displaced.

Example 2

A. Non-Milled $MnO_2$ Composition Mixture, Hydrogen Gas Suppressed

In one embodiment, galvanic alloy particles, SAP, and $MnO_2$ are prepared by being blended together in a blending apparatus to form a powder mixture. The materials include 0.5 grams of MgFe, 0.5 grams SA60S, and 0.5 grams $MnO_2$. The powder mixture is placed in the test tube and 5 grams of 3% saline solutions is added. A stopper is positioned that forces gases expelled by the exothermic reaction to pass through the tubing into a completely full water flask. Water is displaced into a beaker. The amount of water displaced by the gas generation was recorded, with approximately 62.9% gas generated versus non-suppressed Example 1, yielding approximately 37% gas suppression.

B. Milled $MnO_2$ Composition Mixture, Hydrogen Gas Suppressed

In one embodiment, galvanic alloy particles and SAP are prepared by alloying MgFe with $MnO_2$ using a high-speed ball mill and combining it with the SAP (SA60S). The materials include 0.5 grams of MgFe/$MnO_2$ alloy blended with 0.5 grams SA60S. The MgFe/$MnO_2$ alloy is blended with the SAP. The blended MgFe/$MnO_2$ alloy with SAP is placed in the test tube and 5 grams of 3% saline solutions is added. A stopper is positioned that forces gases expelled by the exothermic reaction to pass through the tubing into a completely full water flask. Water is displaced into a beaker. The amount of water displaced by the gas generation is recorded. Results show a majority of gas produced by the reaction to be suppressed.

Example 3

$KMnO_4$ Potassium Permanganate Composition Mixture, Hydrogen Gas Suppressed

In one embodiment, galvanic alloy particles, SAP, and $KMnO_4$ are prepared by being blended together in a blending apparatus to form a powder mixture. The galvanic alloy materials include 0.5 grams of MgFe, 0.5 grams SA60S, and 0.5 grams $KMnO_4$. The powder mixture is placed in the test tube and 5 grams of 3% saline solutions is added. A stopper is positioned that forces gases expelled by the exothermic reaction to pass through the tubing into a completely full water flask. Water is displaced into a beaker. The amount of water displaced by the gas generation was recorded, with approximately 6.8% gas generated versus Example 1, yielding approximately 93.2% gas suppression.

It will be understood that many additional changes in the details, materials, steps and arrangement of parts, which have been herein described and illustrated to explain the nature of the invention, may be made by those skilled in the art within the principle and scope of the invention as expressed in the appended claims.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A flameless food heating method of using an exothermic gel to minimize metallic odors in a presence of food or within a food container, comprising:
generating an exothermic reaction that produces heat by exposing a mixture of the expandable exothermic gel-forming composition to water and one or more electrolytes in the absence of air to form the expandable exothermic gel, the mixture comprising first metallic galvanic alloy particles and second metallic galvanic alloy particles, where the first particles serve as a cathode and the second particles serve as an anode with a different oxidation potential than the cathode, a metallic secondary shell comprised of at least one transitional metal, and a super absorbent polymer; and
sequestering at or about 95% hydrogen of the exothermic reaction within a matrix of the gel before the hydrogen escapes so that steam permeates around the food or the food container.

2. The method of claim 1, wherein the composition is encapsulated in a material comprising at least one of polyester, polyamides, and polyurethane.

3. The method of claim 1, wherein the composition comprises a binder comprising styrene-butadiene copolymers.

4. The method of claim 1, further comprising: maintaining a temperature of the food container at least at 100° F. for at least one hour.

5. The method of claim 1, wherein between about 95% to about 100% of hydrogen produced by the exothermic reaction are suppressed and not released from the gel.

6. The method of claim 1, wherein the at least one transitional metal of the secondary shell comprises Manganese Dioxide.

7. The method of claim 1, wherein the at least one transitional metal of the secondary shell comprises potassium permanganate or potassium ferrate.

8. The method of claim 1, wherein the first and second galvanic alloy particles comprise magnesium and iron, and wherein the super absorbent polymer is sodium polyacrylamide.

9. The method of claim 1, wherein the mixture is a homogeneous mixture formed by blending the secondary shell and the super absorbent polymer with each other.

10. The method of claim 1, wherein activated carbon is blended with the first and second metallic galvanic alloy particles, the metallic secondary shell, and the super absorbent polymer.

11. The method of claim 10, wherein the activated carbon is blended or alloyed with magnetite, and the activated carbon comprises between 2 and 25% of a total weight of the gel-forming composition.

12. The method of claim 11, wherein the activated carbon absorbs an odor produced by the exothermic reaction during gel-formation.

13. The method of claim 1, wherein water and Hydrogen Peroxide ($H_2O_2$) are byproducts of the exothermic reaction.

14. A method of using an expandable exothermic gel, comprising:
generating an exothermic reaction that produces heat by exposing a mixture of the expandable exothermic gel-forming composition to water and an electrolyte in the absence of air to form the expandable exothermic gel, the mixture comprising manganese dioxide blended with a buffering agent comprising a super absorbent polymer; and
suppressing at least about 95% hydrogen gas byproducts of the exothermic reaction within a matrix of the exothermic gel before the hydrogen escapes.

15. The method according to claim 14, wherein the mixture is a homogeneous mixture formed by blending the manganese dioxide and the super absorbent polymer with each other.

16. The method according to claim 14, wherein water and Hydrogen Peroxide ($H_2O_2$) are byproducts of the exothermic reaction.

17. The method according to claim 14, wherein the super absorbent polymer is sodium polyacrylamide.

* * * * *